US007007273B2

(12) United States Patent
Cashin et al.

(10) Patent No.: US 7,007,273 B2
(45) Date of Patent: Feb. 28, 2006

(54) OBJECT ORIENTED MODEL OF PRELOADING SOFTWARE

(75) Inventors: Mary Lynn Cashin, Cary, NC (US); Timothy Alan Jones, Cary, NC (US); Joshua Neil Novak, Raleigh, NC (US); Rod David Waltermann, Rougemount, NC (US); Arnold S. Weksler, Raleigh, NC (US)

(73) Assignee: Lenovo (Singapore) Pte Ltd., Central 1 (SG)

( * ) Notice: Subject to any disclaimer, the term of this patent is extended or adjusted under 35 U.S.C. 154(b) by 618 days.

(21) Appl. No.: 10/020,697

(22) Filed: Oct. 29, 2001

(65) Prior Publication Data

US 2003/0084437 A1 May 1, 2003

(51) Int. Cl.
*G06F 9/445* (2006.01)
(52) U.S. Cl. .................... 717/175; 717/107; 717/169
(58) Field of Classification Search ........ 717/106–123, 717/168–178, 121, 175
See application file for complete search history.

(56) References Cited

U.S. PATENT DOCUMENTS

| 4,558,413 | A | 12/1985 | Schmidt et al. ............. 364/300 |
| 4,872,958 | A | 10/1989 | Suzuki et al. ................. 204/98 |
| 4,881,270 | A | 11/1989 | Knecht et al. ................ 382/17 |
| 5,615,400 | A | 3/1997 | Cowsar et al. .............. 395/685 |
| 5,872,957 | A | 2/1999 | Worthington et al. ....... 395/500 |
| 5,918,250 | A * | 6/1999 | Hammond ................... 711/205 |
| 6,105,089 | A | 8/2000 | Chari et al. ................. 710/103 |
| 6,226,692 | B1 | 5/2001 | Miloushev et al. ......... 709/316 |
| 6,370,614 | B1 * | 4/2002 | Teoman et al. ............. 711/113 |

* cited by examiner

*Primary Examiner*—Ted T. Vo
(74) *Attorney, Agent, or Firm*—Robert A. Voigt, Jr.; Winstead Sechrest & Minick P.C.

(57) ABSTRACT

A method, system and computer program product for creating a preload. A preload may be stored onto a computer system prior to the computer system being manufactured. One or more attributes of an object of a preload may be defined. Each preload object may be an aggregation of one or more software element objects. A comparison may be made between the attributes in each software element object with the one or more attributes in the defined preload object. Upon identifying one or more software element objects whose attributes comprise the one or more attributes of the defined preload object, one or more part numbers associated with the one or more identified software element objects may be transmitted to a manufacturing system. Software associated with the identified one or more software element objects may be retrieved and installed onto a preload associated with the defined preload object.

15 Claims, 4 Drawing Sheets

OBJECT ORIENTED MODEL OF PRELOADING SOFTWARE

TECHNICAL FIELD

The present invention relates to the field of preloading software onto a computer system, and more particularly to efficiently preloading various configurations of software onto a computer system implementing an object oriented model.

BACKGROUND INFORMATION

It is common practice in the data processing industry and especially in the personal computer industry to preload a device driver, an operating system and application software onto an individual system as part of the manufacturing process before the computer system is actually manufactured. The operating system, device driver and application software may together be referred to as a "preload" which may be stored onto the computer system such as on a hard drive. In the past, the relatively small number of different preloads, i.e., different combinations of different versions of operating systems, device drivers and application software, available for use with a personal computer meant that a high degree of standardization was possible in the manufacturing process. As personal computer systems have become more powerful and therefore capable of using a larger number of different and more sophisticated operating systems, device drivers and application software, the manufacturing process has to be able to manage a larger number of possible system software configurations. This complexity becomes even greater in today's manufacturing environment where the end-user of the system is able to specify in greater detail the exact system configuration required including what software is to be preloaded onto his/her system. Therefore, the software preload stage of the manufacturing process has to be able to handle a manufacturing environment where each system is potentially unlike any other system in terms of installed software.

Preloading is conventionally carried out using a server based system where the server holds the images or all the different types, e.g., different language versions, of software, e.g., preloads, available for loading. Each individual computer system is connected to the server via an adapter, e.g., token ring adapter. A diskette which may be loaded with data may be used to define the software, e.g., preload, to be loaded onto that system. The major drawbacks with this mode of operation are in the initial cost of the server hardware and also in the ongoing costs of operating and maintaining the server. Furthermore, the process of creating and maintaining software images requires significant effort in terms of skill and manpower. Furthermore, as new hardware components are added and/or removed, e.g., adding a video card to the computer system, the number of permutations of preloads increase significantly. Under this method, each permutation may require a new preload to be created. For example, a new preload may have to be created because a newer version of a device driver is required to link a particular video card to be installed on the computer system to the operating system.

It would therefore be desirable to develop a model for efficiently changing any piece of software such as a preload without necessarily having to create a new preload upon adding and/or removing hardware components of the computer system. That is, it would therefore be desirable to develop a model for efficiently preloading various configurations of software such as a preload onto a computer system without creating a new preload for each permutation.

SUMMARY

The problems outlined above may at least in part be solved in some embodiments by creating an object oriented model for efficiently changing any piece of software such as a preload without necessarily having to create a new preload upon adding and/or removing hardware components of the computer system.

In one embodiment of the present invention, a method for creating a preload may comprise the step of defining one or more attributes of an object of the preload. Each preload object may be aggregation of one or more software element objects where each software element object may constitute one or more sub-objects such as a device driver object, an operating system object and an application software object.

A comparison may then be made between the attributes in each software element object with the one or more attributes in the defined preload object. A comparison may be made between the attributes in each software element object with the one or more attributes in the defined preload object to identify those software element object(s) that at least include all the attributes in the defined preload object. For example, if one of the software element objects had an attribute of supporting all Windows™ operating systems and the defined preload object had an attribute of supporting Windows™ 2000, then that software element object may be identified since all Windows™ operating systems include Windows™ 2000. However, if one of the software element objects had an attribute of supporting Windows™ Millennium and the defined preload object had an attribute of supporting Windows™ 2000, then that software element object would not be identified.

Upon identifying one or more software element objects whose attributes comprise the one or more attributes of the defined preload object, a determination may be made as to whether to modify any of the attributes of the identified one or more software element objects. One or more attributes may be modified in the identified one or more software element objects to match the one or more attributes of the defined preload object. For example, if one of the identified software element objects had an attribute of supporting all Windows™ operating systems and the defined preload object had an attribute of supporting Windows™ 2000, then one of the attributes in the identified software element object may be modified to specifically support Windows™ 2000 instead of supporting all Windows™ operating systems.

If any attributes need to be modified in the identified one or more software element objects, then one or more attributes of the one or more identified software element objects may be modified to match the one or more attributes of the defined preload object. If none of the attributes need to be modified in the identified one or more software element objects, then none of the attributes of the one or more identified software element objects are modified.

The attributes of the one or more identified software element objects including any attributes that were modified may then be stored in a configuration file associated with the defined preload object. The configuration file associated with the defined preload object may then be transmitted to a manufacturing system. Since each software element object may comprise an attribute such as a part number, the part number may be used in the manufacturing process to install the correct software onto a preload that may be loaded onto a storage unit, e.g., disk unit, of a computer system before the computer system is actually manufactured. Hence, the configuration file may comprise a part number for each identified one or more software element objects.

The software associated with the identified one or more software element objects may be retrieved based on the one or more part numbers in the configuration file transmitted. Once retrieved, the software associated with the identified one or more software element objects may be installed onto a preload associated with the defined preload object.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
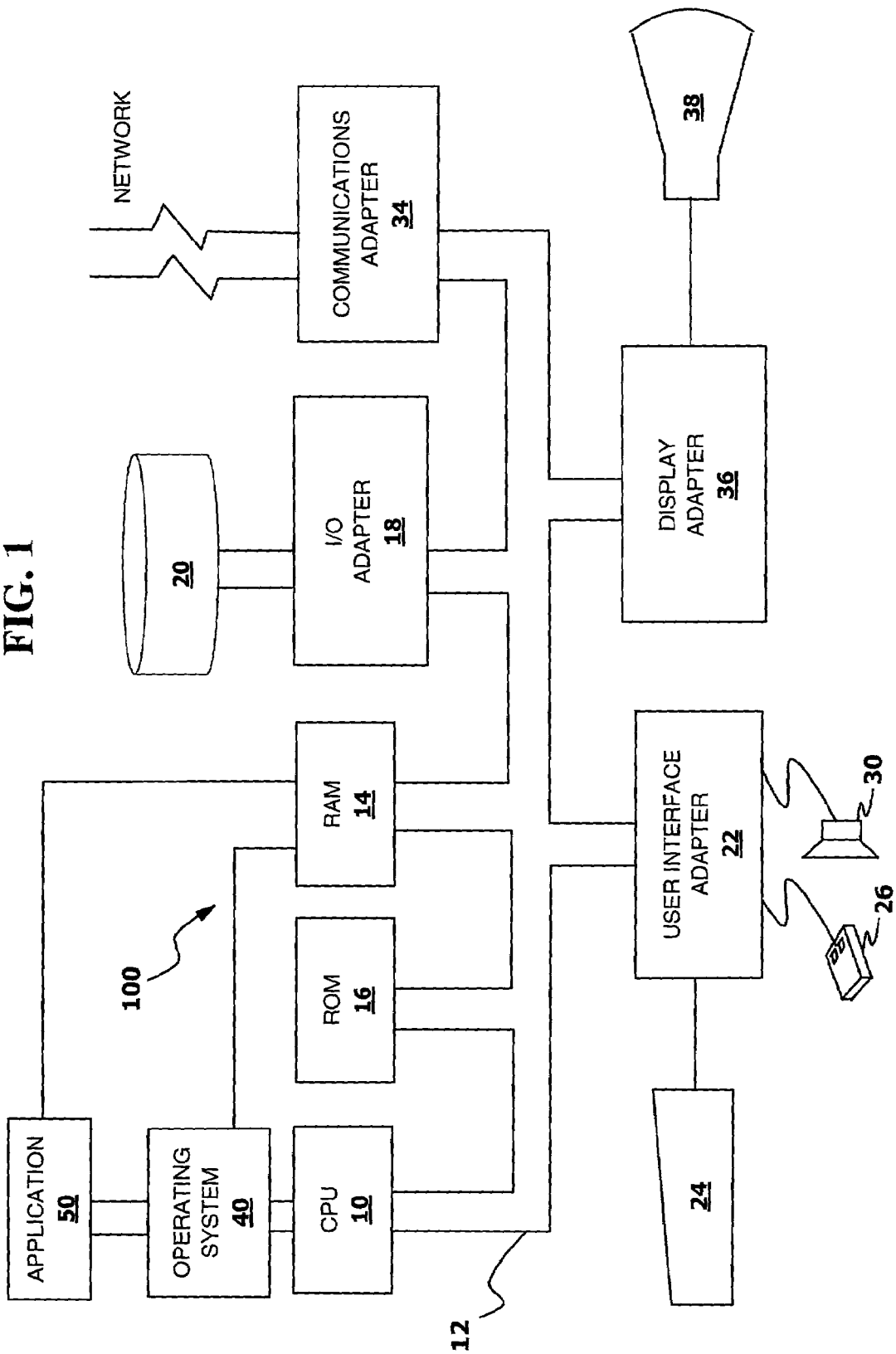
FIG. 1 illustrates a data processing system configured in accordance with the present invention.

FIG. 1—Computer System

FIG. 1 illustrates a typical hardware configuration of a data processing system 100 which is representative of a hardware environment for practicing the present invention. Data processing system 100 may comprise a central processing unit (CPU) 10 coupled to various other components by system bus 12. An operating system 40 runs on CPU 10 and provides control and coordinates the functions of the various components of FIG. 1. An application 50 in accordance with the principles of the present invention runs in conjunction with operating system 40 and provides output calls to operating system 40 where the output calls implement the various functions or services to be performed by application 50. Application 50 may include for example, a program for creating a preload as described in FIG. 3. Read only memory (ROM) 16 is coupled to system bus 12 and includes a basic input/output system ("BIOS") that controls certain basic functions of data processing system 100. Random access memory (RAM) 14, I/O adapter 18, and communications adapter 34 are also coupled to system bus 12. It should be noted that software components including operating system 40 and application 50 are loaded into RAM 14 which is the computer system's main memory. I/O adapter 18 may be an integrated drive electronics ("IDE") adapter that communicates with disk unit 20, e.g., disk drive. It is noted that the program of the present invention that creates a preload, as described in FIG. 3, may reside in disk unit 20 or in application 50.

Communications adapter 34 interconnects bus 12 with an outside network thereby enabling data processing system 100 to communicate with other such systems. Input/Output devices are also connected to system bus 12 via a user interface adapter 22 and display adapter 36. Keyboard 24, mouse 26 and speaker 30 are all interconnected to bus 12 through user interface adapter 22. Event data may be input to data processing system 100 through any of these devices. A display monitor 38 is connected to system bus 12 by display adapter 36. In this manner, a user is capable of inputting to data processing system 100 through keyboard 24 or mouse 26 and receiving output from data processing system 100 via display 38 or speaker 30.

Implementations of the invention include implementations as a computer system programmed to execute the method or methods described herein, and as a computer program product. According to the computer system implementation, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in the disk drive 20). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change.

Figure 2:
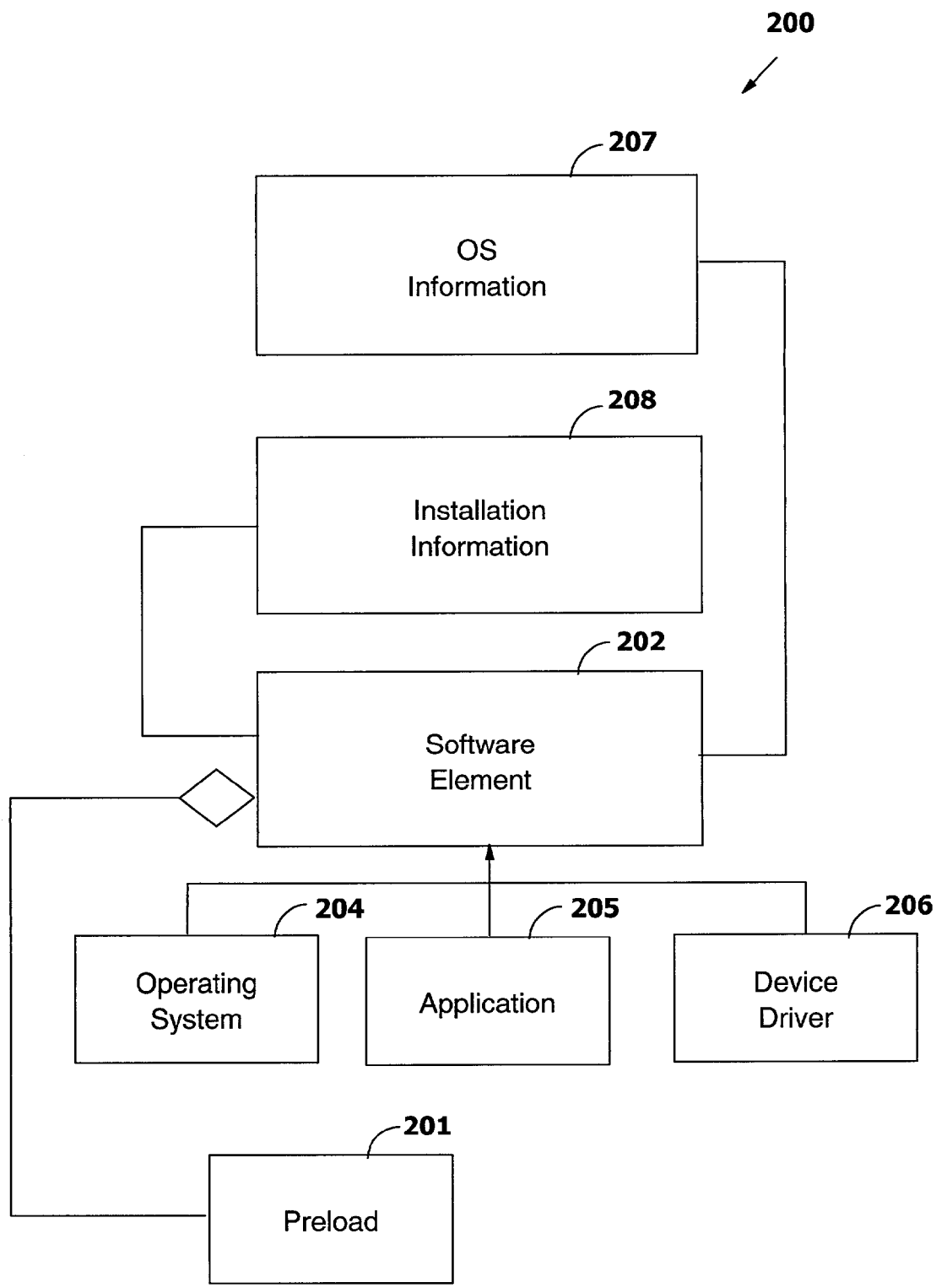
FIG. 2 illustrates a Unified Modeling Language (UML) diagram of a model of a preload system in accordance with the present invention.

FIG. 2—Unified Modeling Language Diagram of Model of Preload

FIG. 2 illustrates an embodiment of the present invention of a Unified Modeling Language (UML) diagram 200 of a model of a preload. As stated in the Background Information section, preloading is conventionally carried out using a server based system where the server holds the images or all the different types, e.g., different language versions, of software, e.g., preloads, available for loading. Each individual computer system is connected to the server via an adapter, e.g., token ring adapter. A diskette which may be loaded with data may be used to define the software, e.g., preload, to be loaded onto that system. The major drawbacks with this mode of operation are in the initial cost of the server hardware and also in the ongoing costs of operating and maintaining the server. Furthermore, as new hardware components are added and/or removed, e.g., adding a video card to the computer system, the number of permutations of preloads may increase significantly. Under this method, each permutation may require a new preload to be created. For example, a new preload may have to be created because a newer version of a device driver is required to link a particular video card to be installed on the computer system to the operating system. It would therefore be desirable to develop a model for efficiently changing any piece of software such as a preload without necessarily having to create a new preload upon adding and/or removing hardware components of the computer system. That is, it would therefore be desirable to develop a model for efficiently preloading various configurations of software such as a preload onto a computer system without creating a new preload for each permutation. FIG. 2 is a UML diagram of a model 200. Model 200 may be an object-oriented model that may include a plurality of objects. In accordance with object-oriented software architectures, objects may constitute sub-objects, which may inherit attributes and methods of the parent objects.

Referring to FIG. 2, a preload which may comprise one or more of a device driver, operating system and application software may be loaded onto a storage unit, e.g., disk unit 20, of a computer system, e.g., data processing system 100, before the computer system is actually manufactured. It is noted that even though the following discusses a preload as comprising one or more of a device driver, operating system and application software that a preload may comprise other types of software such as firmware and that the principles of the present invention would encompass such embodiments.

A preload object 201 may be comprised of an aggregation of one or more software element objects 202. Each software element object 202 may constitute sub-objects such as an operating system object 204, application software object 205 and device driver object 206. A further description of operating system object 204, application software object 205 and device driver object 206 is provided below. It is noted that software element object 202 may constitute other types of sub-objects such as a firmware object and that the principles of the present invention would encompass such embodiments.

Each software element object 202 may have attributes, i.e., data, associated with it such as operating system information 207 and installation information 208. Operating system information 207 may include data that enumerates the specific version and type of operating systems, e.g., Windows™ 98, that are compatible with software element object 202. Furthermore, operating system information 207 may include data that specifies the types of native and non-native languages, e.g., UK English, Canadian French, U.S. English, of the operating system compatible with software element object 202.

Installation information 208 may include data that enumerates the installation order of the software associated with sub-objects, e.g., operating system object 204, application software object 205, device driver object 206, onto the preload. For example, the operating system may have to be loaded prior to the installation of the application software onto the storage device, e.g., disk unit 20, of the computer system, e.g., data processing unit 100. Installation information 208 may further include data as to how and where the components of software associated with software element object 202 may be installed. For example, the components of the software associated with software element object 202 may be installed via an executable file onto a particular directory, e.g., c:\program file.

Each software element object 202 may have attributes associated with it such as a part number which may be used in the manufacturing process to install the correct software associated with software element object 202 onto a particular preload that may be loaded onto a storage unit, e.g., disk unit 20, of a computer system, e.g., data processing system 100, before the computer system is actually manufactured. Furthermore, each software element object 202 may be associated with an attribute as to the module size, i.e., the amount of memory on a storage medium such as a compact disc required to store the software associated with software element object 202 as well as the logical size, e.g., memory space on a hard drive, required to install the correct software associated with software element object 202 onto the particular preload.

Each preload object 201 may have attributes associated with it such as the type of operating system, e.g., Windows™ 2000, and languages supported by the operating system, e.g., U.K. English, Canadian French. A discussion of a method for creating a preload in accordance with model 200 is discussed below.

Figure 3:
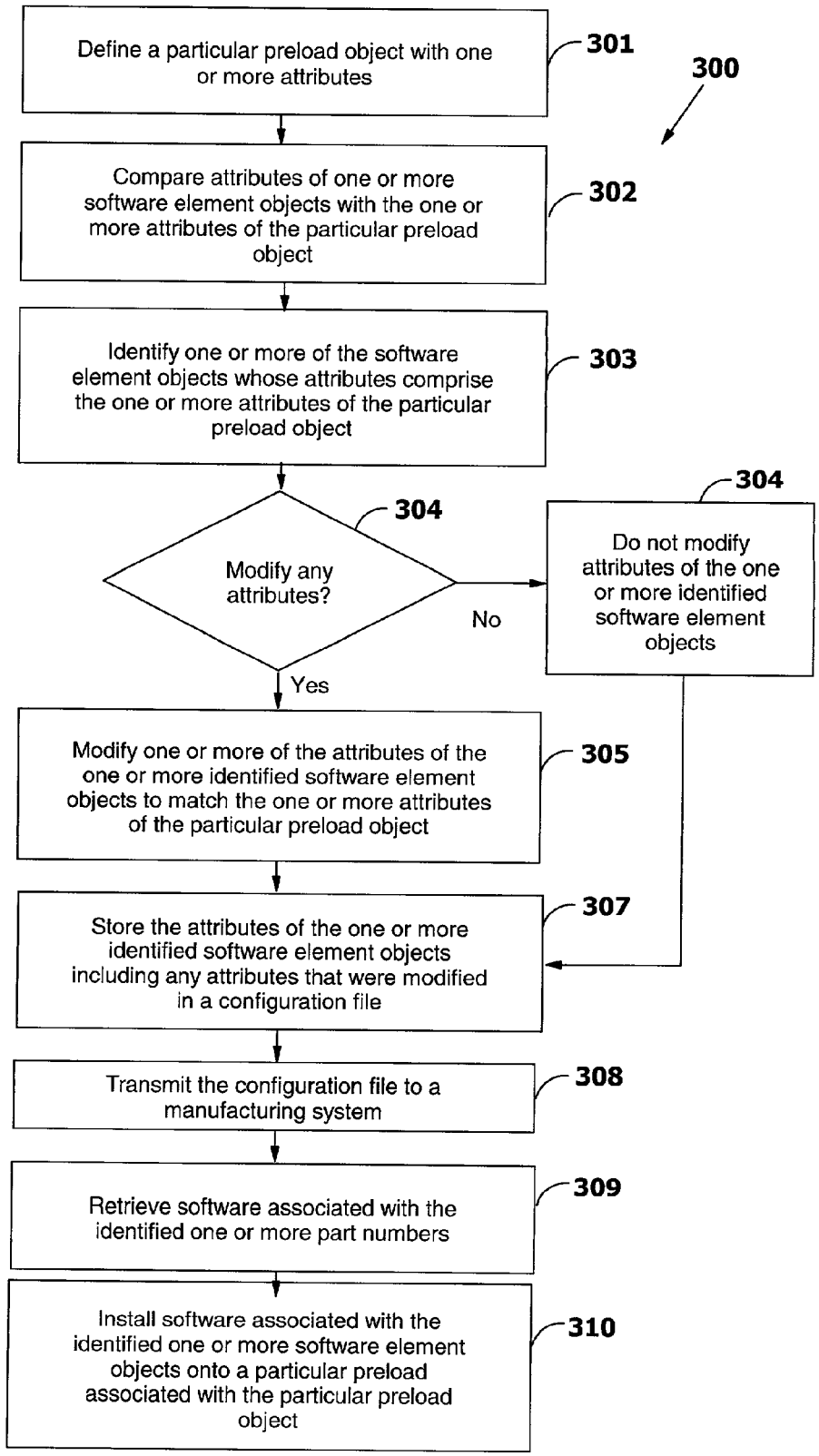
FIG. 3 is a flowchart of a method for creating a preload.

FIG. 3—Method for Creating a Preload

FIG. 3 is a flowchart of one embodiment of the present invention of a method 300 for creating a preload.

In step 301, a particular preload object 201 may be defined with one or more attributes. As stated above, each preload object 201 may have attributes associated with it such as the type of operating system, e.g., Windows™ 2000, and languages supported by the operating system, e.g., U.K. English, Canadian French.

In step 302, a comparison may be made between the attributes in each software element object 202 with the one or more attributes in the particular preload object 201 defined in step 301. As stated above, each software element object 202 may have attributes associated with it such as installation information, operating system information, part number, physical size, logical size required for installation, etc.

Figure 4:
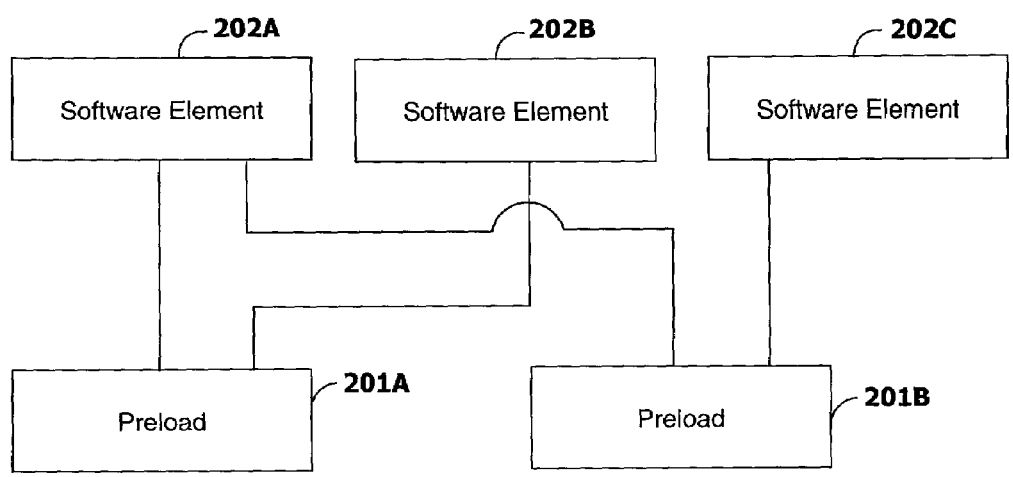
FIG. 4 illustrates one or more software element objects being identified to be installed onto a particular preload in accordance with the present invention.

In step 303, one or more software element objects 202 may be identified whose attributes comprise the one or more attributes of the particular preload object 201 defined in step 301 as illustrated in FIG. 4.

FIG. 4 illustrates one or more software element objects 202 being identified to be installed onto a particular preload in accordance with the present invention. It is noted that FIG. 4 is illustrative and that the one or more attributes of a particular preload object 201 defined in step 301 may be compared with attributes of any number of software element objects 202.

Referring to FIG. 4, software element objects 202A–C may refer to three different software element objects 202 with unique attributes associated with them. For example, software element object 202A may have an attribute, e.g., attribute of operating system information, of supporting all Windows™ operating systems, e.g., Windows™ 2000, Windows™ Millennium. Software element object 202B may have an attribute, e.g., attribute of operating system information, of supporting Windows™ 2000. Software element object 202C may have an attribute, e.g., attribute of operating system information, of supporting Windows™ Millennium.

As stated above, a particular preload object 201 may be defined with one or more attributes in step 301. For example, referring to FIG. 4, preload object 201A may be defined with an attribute of supporting Windows™ 2000. Preload object 201B may be defined with an attribute of supporting Windows™ Millennium.

Upon comparing the attributes in each software element object 202A–C with preload object 201A, software element objects 202A and 202B may be identified as having attributes that comprise the one or more attributes of preload 201A, e.g., attribute of supporting Windows™ 2000. Since software element object 202A has an attribute, e.g., attribute of operating system information, of supporting all Windows™ operating systems, e.g., Windows™ 2000, Windows™ Millennium, software element object 202A has the attribute of supporting Windows™ 2000. Software element object 202B has the attribute of supporting Windows™ 2000. Thus, software element objects 202A and 202B may be identified as having attributes that comprise the one or more attributes of preload object 201A, e.g., attribute of supporting Windows™ 2000.

Upon comparing the attributes in each software element object 202A–C with preload object 201A–B, software element objects 202A and 202C may be identified as having attributes that comprise the one or more attributes of preload object 201B, e.g., attribute of supporting Windows™ Millennium. Since software element object 202B has an attribute, e.g., attribute of operating system information, of supporting all Windows™ operating systems, e.g., Windows™ 2000, Windows™ Millennium, software element object 202B has the attribute of supporting Windows™ Millennium. Software element object 202C has the attribute of supporting Windows™ Millennium. Thus, software element objects 202A and 202C may be identified as having attributes that comprise the one or more attributes of preload object 201B, e.g., attribute of supporting Windows™ Millennium.

Returning to FIG. 3, in step 304, a determination may be made as to whether any attributes need to be modified in the identified one or more software element objects 202 in step 303. One or more attributes may be modified in the identified one or more software element objects 202 in step 303 to match the one or more attributes of the particular preload object 201 defined in step 301. For example, referring to FIG. 4, the attribute of software element object 202A of supporting all Windows™ operating systems may be modified to be an attribute of supporting Windows™ 2000 for preload object 201A and may be modified to be an attribute of supporting Windows™ Millennium for preload object 201B.

If any attributes need to be modified in the identified one or more software element objects 202 in step 303, then, in step 305, one or more attributes of the one or more identified software element objects may be modified to match the one or more attributes of the particular preload object defined in step 301.

If none of the attributes need to be modified in the identified one or more software element objects 202 in step 303, then, in step 306, none of the attributes of the one or more identified software element objects are modified.

In step 307, the attributes of the one or more identified software element objects 202 in step 303 including any attributes that were modified may be stored in a configuration file associated with the particular preload object 201 defined in step 301.

In step 308, the configuration file associated with the particular preload object 201 defined in step 301 may be transmitted to a manufacturing system. As stated above, each software element object 202 may comprise an attribute such as a part number which may be used in the manufacturing process to install the correct software onto a particular preload that may be loaded onto a storage unit, e.g., disk unit 20, of a computer system, e.g., data processing system 100, before the computer system is actually manufactured. Hence, the configuration file may comprise a part number for each identified one or more software element objects 202.

In step 309, software associated with the identified one or more software element objects 202 may be retrieved based on the one or more part numbers in the configuration file transmitted in step 308.

In step 310, the software associated with the identified one or more software element objects 202 that was retrieved in step 309 may be installed onto a particular preload associated with the particular preload object 201 defined in step 301. It is noted that the software associated with the identified one or more software element objects 202 that may be installed onto the particular preload may each have different functionality. For example, one particular software may be used for virus protection while another particular software may be an office suite package. Even though each software associated with the identified one or more software element objects 202 may have different functionality, each software may possess common attributes, i.e., possess the same attributes of the particular preload object 201 defined in step 301.

It is noted that method 300 may be executed in a different order presented and that the order presented in the discussion of FIG. 3 is illustrative. It is further noted that certain steps may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for creating a preload, wherein an object of said preload is an aggregation of one or more software element objects, comprising the steps of:
    defining a particular preload object with one or more attributes;
    comparing attributes of said one or more software element objects with said one or more attributes of said particular preload object, wherein each of said one or more software element objects constitutes one or more of a device driver object, an operating system object and an application software object;
    identifying one or more of said one or more software element objects whose attributes comprise said one or more attributes of said particular preload object; and
    installing software associated with said identified one or more software elements objects onto a particular preload associated with said particular preload object.

2. The method as recited in claim 1 further comprising the step of:
    modifying an attribute of said identified one or more software element objects to match said one or more attributes of said particular preload object.

3. The method as recited in claim 1, wherein each of said one or more software element objects is associated with attribute data, wherein said attribute data comprises one or more of an operating system information and an installation information.

4. The method as recited in claim 1, wherein each of said one or more software element objects is associated with attribute data, wherein said attribute data comprises a part number.

5. A method for creating a preload, wherein an object of said preload is an aggregation of one or more software element objects, comprising the steps of:
    defining a particular preload object with one or more attributes;
    comparing attributes of said one or more software element objects with said one or more attributes of said particular preload object, wherein each of said one or more software element objects constitutes one or more of a device driver object, an operating system object and an application software object;
    identifying one or more of said one or more software element objects whose attributes comprise said one or more attributes of said particular preload object;

installing software associated with said identified one or more software elements objects onto a particular preload associated with said particular preload object;

transmitting one or more part numbers associated with said identified one or more software element objects to a manufacturing system; and retrieving software associated with said identified one or more software element objects based on said one or more part numbers;

wherein each of said one or more software element objects is associated with attribute data, wherein said attribute data comprises a part number.

6. A computer program product having a computer readable medium having computer program logic recorded thereon for creating a preload, comprising the programming steps of:

defining a particular preload object with one or more attributes;

comparing attributes of said one or more software element objects with said one or more attributes of said particular preload object, wherein each of said one or more software element objects constitutes one or more of a device driver object, an operating system object and an application software object;

identifying one or more of said one or more software element objects whose attributes comprise said one or more attributes of said particular preload object; and installing software associated with said identified one or more software elements objects onto a particular preload associated with said particular preload object.

7. The computer program product as recited in claim 6 further comprises the programming step of:

modifying an attribute of said identified one or more software element objects to match said one or more attributes of said particular preload object.

8. The computer program product as recited in claim 6, wherein each of said one or more software element objects is associated with attribute data, wherein said attribute data comprises one or more of an operating system information and an installation information.

9. The computer program product as recited in claim 6, wherein each of said one or more software element objects is associated with attribute data, wherein said attribute data comprises a part number.

10. A computer program product having a computer readable medium having computer program logic recorded thereon for creating a preload, comprising the programming steps of:

defining a particular preload object with one or more attributes;

comparing attributes of said one or more software element objects with said one or more attributes of said particular preload object, wherein each of said one or more software element objects constitutes one or more of a device driver object, an operating system object and an application software object;

identifying one or more of said one or more software element objects whose attributes comprise said one or more attributes of said particular preload object;

installing software associated with said identified one or more software elements objects onto a particular preload associated with said particular preload object;

transmitting one or more part numbers associated with said identified one or more software element objects to a manufacturing system; and retrieving software associated with said identified one or more software element objects based on said one or more part numbers;

wherein each of said one or more software element objects is associated with attribute data, wherein said attribute data comprises a part number.

11. A system, comprising:

a processor; and a memory unit coupled to said processor, wherein said memory unit is operable for storing a computer program for creating a preload, wherein an object of said preload is an aggregation of one or more software element objects, wherein the computer program is operable for performing the following programming steps:

defining a particular preload object with one or more attributes;

comparing attributes of said one or more software element objects with said one or more attributes of said particular preload object, wherein each of said one or more software element objects constitutes one or more of a device driver object, an operating system object and an application software object;

identifying one or more of said one or more software element objects whose attributes comprise said one or more attributes of said particular preload object; and installing software associated with said identified one or more software element objects onto a particular preload associated with said particular preload object.

12. The system as recited in claim 11, wherein the computer program is further operable for performing the following programming step:

modifying an attribute of said identified one or more software element objects to match said one or more attributes of said particular preload object.

13. The system as recited in claim 11, wherein each of said one or more software element objects is associated with attribute data, wherein said attribute data comprises one or more of an operating system information and an installation information.

14. The system as recited in claim 11, wherein each of said one or more software element objects is associated with attribute data, wherein said attribute data comprises a part number.

15. A system, comprising:

a processor; and a memory unit coupled to said processor, wherein said memory unit is operable for storing a computer program for creating a preload, wherein an object of said preload is an aggregation of one or more software element objects, wherein the computer program is operable for performing the following programming steps:

defining a particular preload object with one or more attributes;

comparing attributes of said one or more software element objects with said one or more attributes of said particular preload object, wherein each of said one or more software element objects constitutes one or more of a device driver object, an operating system object and an application software object;

identifying one or more of said one or more software element objects whose attributes comprise said one or more attributes of said particular preload object;

installing software associated with said identified one or more software element objects onto a particular preload associated with said particular preload object;

transmitting one or more part numbers associated with said identified one or more software element objects to a manufacturing system; and retrieving software associated with said identified one or more software element objects based on said one or more part numbers;

wherein each of said one or more software element objects is associated with attribute data, wherein said attribute data comprises a part number.

* * * * *